(12) United States Patent
Salkintzis

(10) Patent No.: US 12,745,114 B2
(45) Date of Patent: Sep. 22, 2026

(54) QUALITY OF SERVICE FLOW SELECTION FOR A MULTI-ACCESS DATA CONNECTION

(71) Applicant: Lenovo (Singapore) Pte. Ltd., New Tech Park (SG)

(72) Inventor: Apostolis Salkintzis, Athens (GR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 252 days.

(21) Appl. No.: 18/554,169

(22) PCT Filed: Apr. 6, 2021

(86) PCT No.: PCT/EP2021/058882

§ 371 (c)(1),
(2) Date: Oct. 5, 2023

(87) PCT Pub. No.: WO2022/214158

PCT Pub. Date: Oct. 13, 2022

(65) Prior Publication Data

US 2024/0196243 A1 Jun. 13, 2024

(51) Int. Cl.

| | |
|---|---|
| ***H04W 24/08*** | (2009.01) |
| ***H04W 28/02*** | (2009.01) |
| ***H04W 28/08*** | (2023.01) |

(52) U.S. Cl.

CPC ....... *H04W 24/08* (2013.01); *H04W 28/0268* (2013.01); *H04W 28/08* (2013.01)

(58) Field of Classification Search

None

See application file for complete search history.

(56) References Cited

U.S. PATENT DOCUMENTS

| | | | | |
|---|---|---|---|---|
| 12,082,048 | B2 * | 9/2024 | Salkintzis | H04W 76/16 |
| 2019/0116517 | A1 * | 4/2019 | Liu | H04W 76/10 |

(Continued)

FOREIGN PATENT DOCUMENTS

| | | |
|---|---|---|
| CN | 110536484 A | 12/2019 |
| EP | 3958645 A1 | 2/2022 |

(Continued)

OTHER PUBLICATIONS

Ly. U.S. Appl. No. 63/108,957, filed Nov. 3, 2020.*

(Continued)

*Primary Examiner* — Andre Tacdiran

(74) *Attorney, Agent, or Firm* — Kunzler Needham & Hilton; Bruce R. Needham

(57) ABSTRACT

Apparatuses, methods, and systems are disclosed for quality of service flow selection for a multi-access data connection. One apparatus includes a first interface that communicates with a mobile communication network over a first access network. The apparatus includes a second interface that communicates with the mobile communication network over a second access network. The apparatus includes a processor that sends a request message containing a first capability indicating that the apparatus supports measurements per QoS flow. The processor receives a response message containing a first indicator, the first indicator provided in response to containing the first capability in the request message. The processor sends a performance measurement function message to measure a first performance parameter for a first service data flow.

20 Claims, 7 Drawing Sheets

(56) References Cited

U.S. PATENT DOCUMENTS

| | | | | |
|---|---|---|---|---|
| 2019/0166398 | A1 | 5/2019 | Lee | |
| 2020/0236727 | A1 | 7/2020 | Salkintzis | |
| 2020/0336940 | A1* | 10/2020 | Salkintzis | H04W 28/082 |
| 2021/0045031 | A1 | 2/2021 | Lee et al. | |
| 2022/0038955 | A1* | 2/2022 | Hande | H04W 28/10 |
| 2022/0182861 | A1* | 6/2022 | Youn | H04W 24/08 |
| 2022/0322152 | A1* | 10/2022 | Youn | H04W 28/0273 |
| 2023/0189368 | A1* | 6/2023 | Zhou | H04W 28/0865 370/328 |
| 2023/0413114 | A1* | 12/2023 | Ly | H04W 28/0215 |
| 2024/0015562 | A1* | 1/2024 | Youn | H04W 24/10 |
| 2024/0397381 | A1* | 11/2024 | Ly | H04W 28/0215 |

FOREIGN PATENT DOCUMENTS

| | | | |
|---|---|---|---|
| WO | 2019210966 | A1 | 11/2019 |
| WO | WO2019223852 | A1 * | 11/2019 |
| WO | 2020218807 | A1 | 10/2020 |
| WO | 2021035206 | A1 | 2/2021 |

OTHER PUBLICATIONS

Huawei Hisilicon, “Clarification on EPS bearer identity handling”, 3GPP TSG-CT WG1 Meeting #128-e C1-21XXX, was C1-210957, Feb. 25-Mar. 5, 2021, pp. 1-12.

Ericsson et al., “IP index from UDM”, 3GPP TSG SA WG2 Meeting #143E S2-2101103, Feb. 24-Mar. 9, 2021, pp. 1-7.

LG Electronics et al., “PMF enhancements to support per QoS Flow measurements”, 3GPP TSG-SA WG2 Meeting #143E (e-meeting) S2-2101404, Feb. 24-Mar. 9, 2021, p. 1-4.

Google Inc., “Introduction of UE assisted operation”, 3GPP TSG-SA2 Meeting #144-e S2-2102327, Apr. 12, 2021-Apr. 16, 2021, pp. 1-9.

PCT/EP2021/058882, “International Search Report and the Written Opinion of the International Searching Authority, or the Declaration”, International Searching Authority, Dec. 22, 2021, pp. 1-15.

3GPP, “3rd Generation Partnership Project; Technical Specification Group Services and System Aspects; Study on Access Traffic Steering, Switch and Splitting support in the 5G system architecture Phase 2 (Release 17)”, 3GPP TR 23.700-93 V1.3.0, Mar. 2021, pp. 1-101.

3GPP, “3rd Generation Partnership Project; Technical Specification Group Services and System Aspects; System architecture for the 5G System (5GS); Stage 2 (Release 16)”, 3GPP TS 23.501 V16.8.0, Mar. 2021, pp. 1-451.

3GPP, “3rd Generation Partnership Project; Technical Specification Group Services and System Aspects; Procedures for the 5G System (5GS); Stage 2 (Release 16)”, 3GPP TS 23.502 V16.7.1, Jan. 2021, pp. 1-603.

3GPP, “3rd Generation Partnership Project; Technical Specification Group Core Network and Terminals; 5G System; Access Traffic Steering, Switching and Splitting (ATSSS); Stage 3 (Release 16)”, 3GPP TS 24.193 V16.3.0, Mar. 2021, pp. 1-50.

* cited by examiner

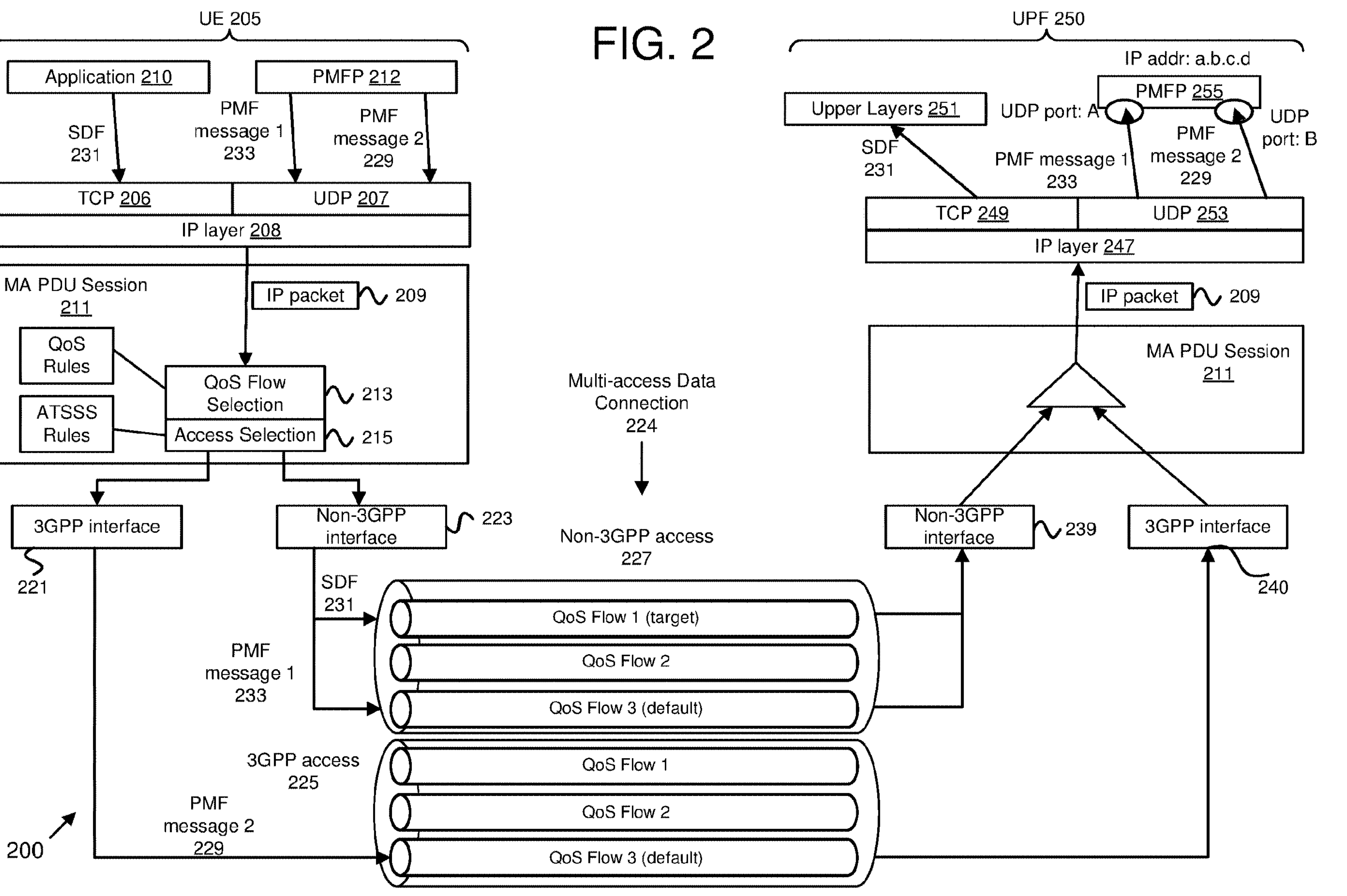
FIG. 2
UE 205
Application 210
PMFP 212
SDF 231
PMF message 1 233
PMF message 2 229
TCP 206
UDP 207
IP layer 208
MA PDU Session 211
IP packet
209
QoS Rules
ATSSS Rules
QoS Flow Selection
213
Access Selection
215
3GPP interface
221
Non-3GPP interface
223
Multi-access Data Connection 224
Non-3GPP access 227
SDF 231
PMF message 1 233
QoS Flow 1 (target)
QoS Flow 2
QoS Flow 3 (default)
3GPP access 225
PMF message 2 229
QoS Flow 1
QoS Flow 2
QoS Flow 3 (default)
200
UPF 250
IP addr: a.b.c.d
PMFP 255
Upper Layers 251
UDP port: A
UDP port: B
SDF 231
PMF message 1 233
PMF message 2 229
TCP 249
UDP 253
IP layer 247
IP packet
209
MA PDU Session 211
Non-3GPP interface
239
3GPP interface
240

QUALITY OF SERVICE FLOW SELECTION FOR A MULTI-ACCESS DATA CONNECTION

The subject matter disclosed herein relates generally to wireless communications and more particularly relates to quality of service flow selection for a multi-access data connection.

BACKGROUND

Certain wireless systems support a feature called multi-access data connections (e.g., multi-access PDU ("MA PDU") session) between a UE and a UPF, and the policy-controlled routing of the MA PDU Session traffic over two access networks. Essentially, an MA PDU Session is a data connection between a UE and a UPF that can transfer data traffic of a service data flow ("SDF") (e.g., data traffic of an application) by using both a 3GPP access network (e.g., NR access or E-UTRA access) and a non-3GPP access network (e.g., Wi-Fi or wireline access) by applying multi-access rules (e.g., Access Traffic Steering, Switching and Splitting ("ATSSS") rules and N4 rules in the UE and in the UPF respectively).

BRIEF SUMMARY

Methods for quality of service flow selection for a multi-access data connection are disclosed. Apparatuses and systems also perform the functions of the methods.

One method of a UE for quality of service flow selection for a multi-access data connection includes communicating, using a first interface of a user equipment, with a mobile communication network over a first access network. The method includes communicating, using a second interface of the user equipment, with the mobile communication network over a second access network. The method includes sending a request message containing a first capability indicating that the apparatus supports measurements per quality of service flow. The method includes receiving a response message containing a first indicator, the first indicator provided in response to containing the first capability in the request message, wherein the response message establishes a multi-access data connection supporting communication over the first access network and the second access network, and wherein the multi-access data connection supports a plurality of quality of service flows including a default quality of service flow. The method includes sending a performance measurement function message to measure a first performance parameter for a first service data flow, wherein the first service data flow is transmitted on a target quality of service flow from the plurality of quality of service flows of the multi-access data connection, and wherein: the performance measurement function message is transmitted on the target quality of service flow of the multi-access data connection in response to the first indicator containing a first value; and the performance measurement function message is transmitted on the default quality of service flow of the multi-access data connection in response to the first indicator containing a second value.

One method of an SMF for quality of service flow selection for a multi-access data connection includes communicating, using an interface, with a plurality of network functions in a mobile communication network and with a user equipment. The method includes receiving a request message from the user equipment containing a first capability, the request message requesting a multi-access data connection supporting communication over a first access network and a second access network. The method includes determining based on the first capability whether the user equipment supports measurements per quality of service flow. The method includes, in response to determining that the user equipment supports measurements per quality of service flow: selecting a user plane function; sending a session establishment request message containing a second indicator to the user plane function, wherein the second indicator indicates whether the user plane function must perform access measurements per quality of service flow over the multi-access data connection; and sending a response message containing a first indicator to the user equipment, wherein the response message establishes the multi-access data connection and wherein the first indicator indicates that the user equipment must perform access measurements per quality of service flow over the multi-access data connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a diagram illustrating one embodiment of a network deployment for quality of service flow selection for a multi-access data connection;

DETAILED DESCRIPTION

Figure 1:
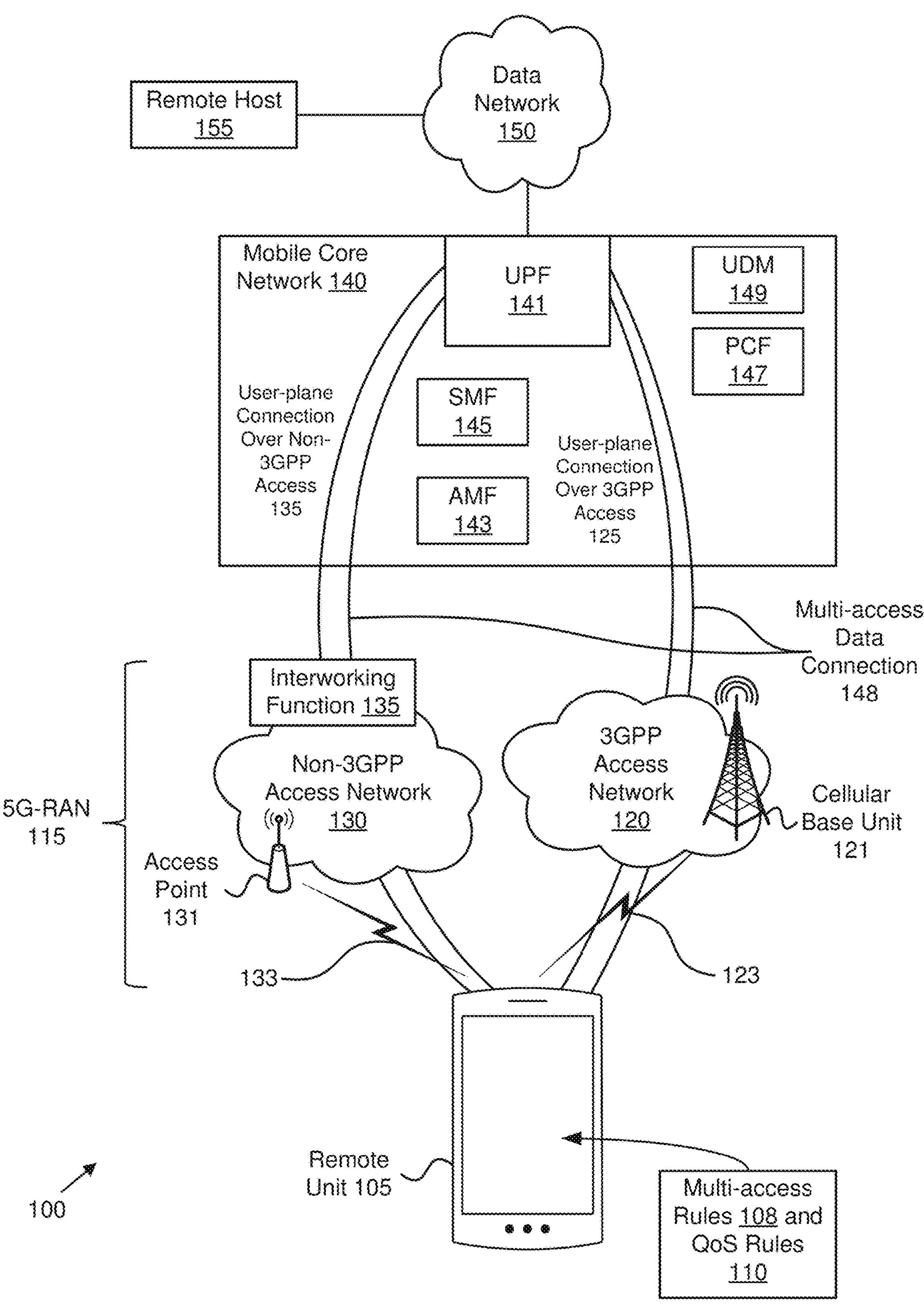
FIG. 1 is a diagram illustrating one embodiment of a wireless communication system for quality of service flow selection for a multi-access data connection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or 25 schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding FIGURES. Like numbers refer to like elements in all figures, including alternate embodiments of like elements.

Methods, apparatuses, and systems are disclosed for quality of service flow selection for a multi-access data connection. The 3GPP specs in Rel-16 define a feature called multi-access data connections (e.g., multi-access PDU ("MA PDU") session) between a user equipment ("UE") and a user plane function ("UPF"), and the policy-controlled routing of the MA PDU Session traffic over two access networks. Essentially, an MA PDU Session is a data connection between a UE and a UPF that can transfer data traffic of a service data flow ("SDF") (e.g., data traffic of an application) by using both a third generation partnership project ("3GPP") access network (e.g., new radio ("NR") access or evolved universal mobile telecommunications system ("UMTS") terrestrial radio access ("E-UTRA") access) and a non-3GPP access network (e.g., Wi-Fi or wireline access) by applying multi-access rules (e.g., Access Traffic Steering, Switching and Splitting ("ATSSS") rules and N4 rules in the UE and in the UPF respectively).

A multi-access rule may indicate that the data traffic of an SDF should be sent over the access with the smallest delay, or over the access with the smallest packet loss rate. To enforce such a multi-access rule, the UE and the UPF must perform measurements over both accesses to determine which access has the smallest delay or the smallest packet loss rate and to steer the data traffic of the SDF accordingly. Such measurements are enabled by a performance measurement function ("PMF") protocol ("PMFP") that operates on the UE and UPF. To measure the delay over one access type, the UE sends PMF Echo-Request messages to UPF over this access type and the UPF responds with PMF Echo-Response messages over the same access type.

The PMF messages in Rel-16 are always sent on the default quality of service ("QoS") flow of the multi-access data connection (e.g., either on the default QoS flow over non-3GPP access or on the default QoS flow over 3GPP access). A multi-access data connection typically has multiple QoS flows, each one supporting data transmission with different QoS parameters.

To improve the measurement accuracy for an SDF, the UE and the UPF must both transmit the PMF messages on the target QoS flow (e.g., on the QoS flow which the SDF data traffic is to be sent). For example, if the UE wants to determine the access type for SDF-1, which is mapped (by the QoS rules) to QoS flow 1, then the UE shall perform measurements by sending PMF messages on QoS flow 1 over both accesses. Similarly, if the UE wants to determine the access type for SDF-2, which is mapped (by the QoS rules) to QoS flow 2, then the UE shall perform measurements by sending PMF messages on QoS flow 2 over both accesses. This capability of sending PMF messages on different QoS flows (vs sending PMF messages on the default QoS flow only) is termed as "measurements per QoS flow."

Before initiating measurements per QoS flow, the UE must know whether the UPF can support measurements per QoS flow and the UPF must also know whether the UE can support measurements per QoS flow. When at least one of the UE and the UPF cannot support measurements per QoS flow, then measurements should be carried out on the default QoS flow.

To overcome these limitations and to improve the performance, the present disclosure specifies a new functionality that enables the UE and the UPF to determine whether they shall perform measurements per QoS flow or measurements on the default QoS flow, after a MA PDU Session is established.

FIG. 1 depicts a wireless communication system 100 for performing measurements on QoS flows, according to embodiments of the disclosure. In one embodiment, the wireless communication system 100 includes at least one remote unit 105 (having multi-access rules 108 and QoS rules 110), a fifth-generation radio access network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, long term evolution ("LTE") or worldwide interoperability for microwave access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host 155 via a network connection with the mobile core network 140. For example, an application in a remote unit 105 (e.g., web browser, media client, telephone/VoIP application) may trigger the remote unit 105 to establish a PDU session (or other data connection (e.g., multi-access data connection 148)) with the mobile core network 140 using the 5G-RAN 115 (e.g., a 3GPP access network 120 and/or a non-3GPP access network 130). The mobile core network 140 then relays traffic between the remote unit 105 and the data network 150 (e.g., remote host 155) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

Moreover, the remote unit 105 may establish a multi-access PDU session (i.e., multi-access data connection) with the mobile core network 140 whereby traffic of the multi-access PDU session is steered over one or both of the 3GPP access network 120 and/or a non-3GPP access network 130, according to steering rules. Additionally, a user-plane connection over 3GPP access 125 may be established over the 3GPP access network 120 for transferring traffic of the multi-access PDU session. Similarly, a user-plane connection over non-3GPP access 135 may be established over the non-3GPP access network 130 for handling traffic of the multi-access PDU session. Accordingly, the remote unit 105 may be configured with multi-access rules 108 and QoS rules 110 for determining QoS data flows for performing measurements.

The cellular base units 121 may be distributed over a geographic region. In certain embodiments, a cellular base unit 121 may also be referred to as an access terminal, a base, a base station, a Node-B, an CNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The N3IWF supports the connection of "untrusted" non-3GPP access networks to the mobile core network (e.g., 5GC), whereas the TNGF supports the connection of "trusted" non-3GPP access networks to the mobile core network. The interworking function 135 supports connectivity to the mobile core network 140 via the "N2" and "N3" interfaces, and it relays "N1" signaling between the remote unit 105 and the AMF 143. Both the 3GPP access network 120 and the interworking function 135 communicate with the AMF 143 using a "N2" interface. The interworking function 135 also communicates with the UPF 141 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least a UPF 141 that serves the 3GPP access network 120 and the non-3GPP access network 130. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, the UPF 141 would be an anchor UPF receiving UP traffic of both intermediate UPFs.

The mobile core network 140 also includes multiple control plane functions including, but not limited to, an Access and Mobility Management Function ("AMF") 143 that serves both the 3GPP access network 120 and the non-3GPP access network 130, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over application programming interfaces ("APIs")), or other NEs defined for the 5GC. In various embodiments, the mobile core network 140 may include a PMF (not shown) to assist the remote unit 105 and/or the UPF 141 in taking performance measurements over the two accesses, including latency measurements. In one embodiment, the PMF may be co-located with the UPF 141.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each slice may be identified using a single network slice selection assistance information ("S-NSSAI"). In certain embodiments, the various network slices may include separate instances of network functions, such as the SMF 145 and UPF 141. In some embodiments, the different network slices may share some common network functions, such as the AMF 143. The different network slices are not shown in FIG. 1 for case of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an mobility management entity ("MME"), S-GW, P-GW, home subscriber server ("HSS"), and the like.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., next generation radio access network ("NG-RAN")) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

To determine whether to perform measurements per QoS flow or measurements on a single QoS flow (e.g., default QoS flow), the remote unit 105 may perform functions to identify capabilities of devices for performing measurements and perform measurements based on such capabilities.

FIG. 2 depicts a first network deployment 200 where data traffic is exchanged between a UE 205 (e.g., one embodiment of the remote unit 105) and a UPF 250 (e.g., one embodiment of the UPF 141) over a MA PDU Session. Essentially, a MA PDU Session supporting communication over 3GPP access 225 and another over non-3GPP access 227.

The UE 205 includes an application 210, a PMFP 212, a transmission control protocol ("TCP") 206, a user datagram protocol ("UDP") 207, and an internet protocol ("IP") layer 208. In one embodiment, the application 210 communicates SDF 231 with the TCP 206. Moreover, in certain embodiments, the PMFP 212 may communicate a first PMF message (e.g., PMF Echo-Request) 233 (PMF message 1) and/or a second PMF message 229 (PMF message 2) with the UDP 207. When a packet 209 (or, in general, a Packet Data Unit ("PDU")) is generated in the UE 205 and is forwarded to the MA PDU Session 211 (as shown in FIG. 2), the packet 209 first goes through QoS flow selection 213 (which uses QoS rules) and then Access Selection 215 that is carried out based on ATSSS rules. During this Access Selection 215 it is decided whether the packet 209 should be sent to the UPF 250 via a 3GPP interface 221 or via a non-3GPP interface 223 over a multi-access data connection 224. The 3GPP access 225 includes a first QoS Flow (QoS Flow 1), a second QoS Flow (QoS Flow 2), and a third QoS Flow (QoS Flow 3) (default). Default QoS flows may carry all data traffic which is not explicitly steered as a non-default QoS flow. Moreover, the non-3GPP access 227 includes a first QoS Flow (QoS Flow 1) (target), a second QoS Flow (QoS Flow 2), and a third QoS Flow (QoS Flow 3) (default).

The second PMF message 229 may be communicated via the 3GPP interface 221 over the QoS Flow 3 (default) of the 3GPP access 225. Moreover, the SDF 231 may be communicated via the non-3GPP interface 223 over the QoS Flow 1 (target) of the non-3GPP access 227 and the first PMF message 233 may be communicated via the non-3GPP interface 223 over the QoS Flow 3 (default) of the non-3GPP access 227.

Note that the UPF 250 includes a non-3GPP interface 239 to receive data transmitted over the non-3GPP access 227 and a 3GPP interface 240 to receive data transmitted over the 3GPP access 225. The IP packet 209 is delivered to IP layer 247 and its data delivered to upper layers. Specifically, a TCP 249 delivers the SDF 231 to upper layers 251 and a UDP 253 delivers the first PMF message 233 to a PMFP 255 (e.g., UDP port A, to IP address a.b.c.d) and the second PMF message 229 to the PMFP 255 (e.g., UDP port B). Both PMF messages may be addressed to the IP address of the PMFP 255 at the UPF (e.g., to IP address a.b.c.d) but they are addressed to different destination ports (e.g., to UDP port A for non-3GPP access and to UDP port B for 3GPP access). After receiving PMF response messages from the UPF 250, the UE 205 may determine that non-3GPP access features the smallest delay and then may decide (based on its multi-access rules—e.g., ATSSS rules) to transmit data traffic of an SDF over the non-3GPP access. As may be appreciated, the data traffic of the SDF may be transmitted on a non-default QoS flow, as indicated by the QoS rules in the UE 205. This may create a measurement inaccuracy issue since the measurements are conducted on a QoS flow (the default QoS flow) other than the QoS where the SDF data traffic itself is sent to (the target QoS flow). If the measurements were conducted on the target QoS instead of the default QoS, then they could lead to a different result (e.g., that 3GPP access has the smallest delay) and, hence, the SDF data traffic should be transmitted over 3GPP access.

Figure 3:
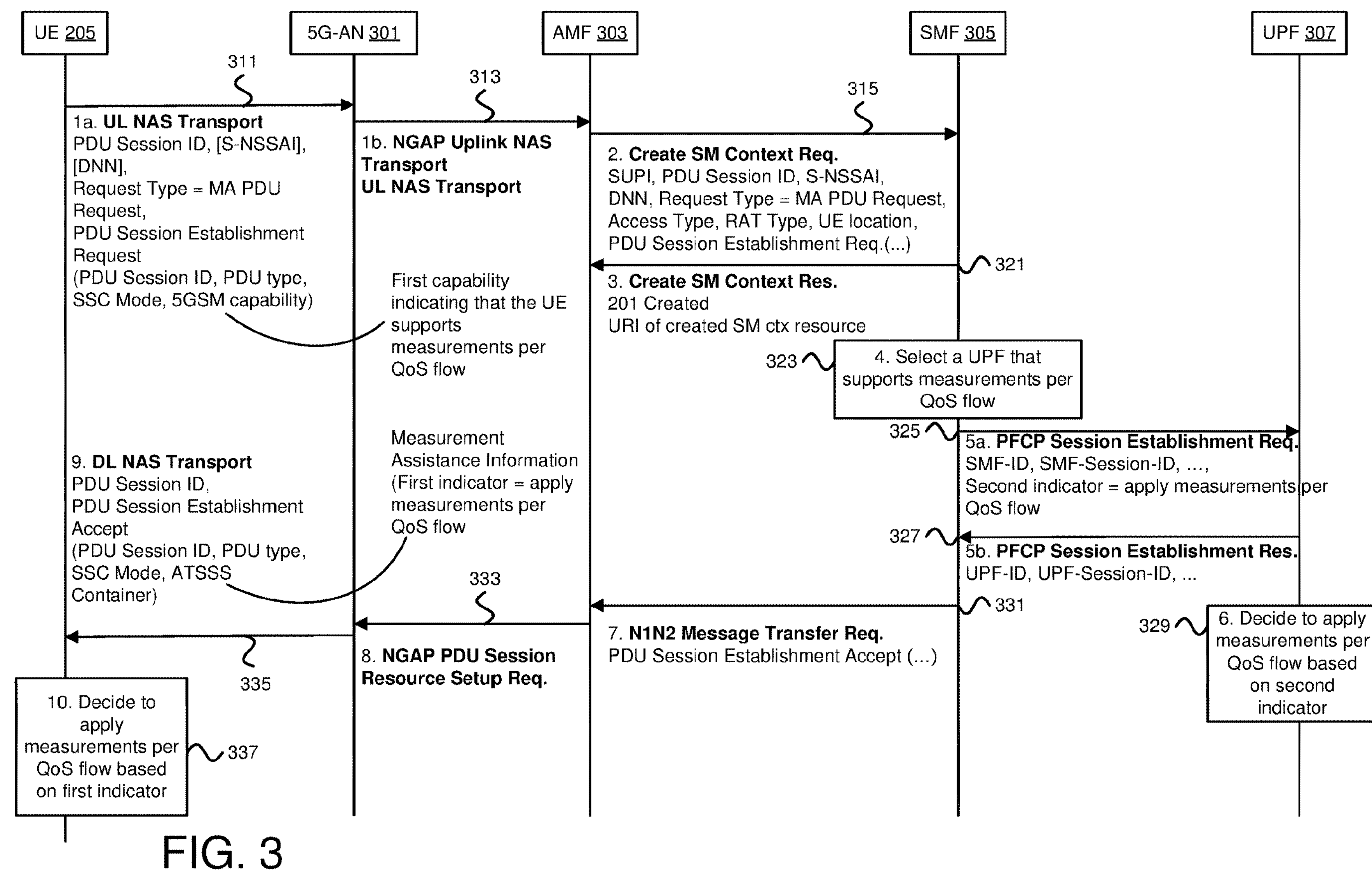
FIG. 3 is a signal flow diagram illustrating one embodiment of a procedure for quality of service flow selection for a multi-access data connection.

FIG. 3 depicts a procedure 300 for quality of service flow selection for a multi-access data connection, according to embodiments of the disclosure. The procedure 300 involves the UE 205, a 5G Access Network ("5G-AN") 301, an AMF 303 (e.g., one embodiment of the AMF 143), an SMF 305 (e.g., one embodiment of the SMF 145), and a UPF 307.

Referring to FIG. 3, the procedure 300 begins at Step 1*a* when, to request the establishment of a MA PDU Session, the UE 205 sends an UL non-access stratum ("NAS") Transport message with Request Type=MA PDU Request and with an embedded PDU Session Establishment Request message, which includes the ATSSS capabilities of the UE 205 in the fifth generation session management ("5GSM") Capability information element (see messaging 311).

As an example, the ATSSS capabilities of the UE 205 may indicate steering functionalities that the UE 205 supports as defined in TS 23.501, and/or a new first capability indicating that the UE 205 supports measurements per QoS flow. At Step 1*b*, the UL NAS Transport message is forwarded by the 5G Access Network to the AMF within a next generation application protocol ("NGAP") Uplink NAS Transport message (sec messaging 313).

At Step 2, based on the Request Type=MA PDU Request, the AMF 303 determines that this is a request for a MA PDU Session and selects an SMF 305 that supports MA PDU Sessions. Subsequently, the AMF 303 sends a Create SM Context Request message to the selected SMF 305 that contains the received PDU Session Establishment Request, which includes the 5GSM Capability information element (sec messaging 315).

The SMF performs the regular interactions with a UDM (e.g., to receive session management ("SM") subscription data for the UE and to register itself as being the serving SMF for the requested MA PDU Session). At Step 3, the SMF 305 creates the SM context requested in step 2 and returns a response to the AMF 303 (see messaging 321).

At Step 4, based on the first capability contained in the PDU Session Establishment Request message, the SMF 305 determines that the UE 205 can support measurements per QoS flow. Then, based on the network capabilities and the network policy, the SMF 305 decides whether measurements in the MA PDU Session will be performed per QoS flow or will be performed on the default QoS flow only. If the SMF 305 decides that measurements in the MA PDU Session will be performed on the default QoS flow only, or the SMF 305 cannot understand the first capability contained in the PDU Session Establishment Request message (e.g., because the SMF 305 does not implement ATSSS extensions defined in Rel-17), then the SMF 305 operates as defined in the Rel-16 of the ATSSS specifications (e.g., establishes the MA PDU Session without enabling measurements per QoS flow). In this case, the UE 205 and the UPF 307 shall perform measurements by sending PMF messages on the default QoS flow only. If the SMF 305 decides that measurements in the MA PDU Session will be performed per QoS flow, then the SMF 305 selects a UPF 307 that can support measurements per QoS flow (if not all UPFs in the mobile core network can support measurements per QoS flow) (see block 323).

At Step 5*a*, the SMF 305 creates an N4 Session with the selected UPF 307, also called Packet Forwarding Control Protocol ("PFCP") session. In the PFCP Session Establishment Request message, the SMF 305 includes the multi-access rules (N4 rules) that should be applied by the UPF 307 along with other data (e.g., SMF-ID, SMF-Session-ID, and so forth) and a new second indicator that indicates to the UPF 307 to apply measurements per QoS flow (e.g., second indicator=apply measurements per QoS flow) (messaging 325).

At Step 5*b*, the UPF 307 sends a PFCP Session Establishment Response to the SMF 305. The PFCP Session Establishment Response may include a UPF-ID, UPF-Session-ID, and so forth (messaging 327).

At Step 6, based on the second indicator received in Step 5*a*, the UPF 307 is configured to apply measurements per QoS flow. Hence, whenever it needs to perform measurements to determine the access on which the DL data traffic of an SDF 305 should be sent, the UPF 307 shall send the applicable PMF messages on the target QoS flow (e.g., on the QoS flow on which the DL data traffic of the SDF 305 is sent) (block 329).

At Step 7, the SMF 305 creates a PDU Session Establishment Accept message for the UE and encapsulates this message into an N1N2 Message Transfer Request that is sent to the AMF 303. The PDU Session Establishment Accept contains the QoS rules for the MA PDU Session and an ATSSS Container, which contains the ATSSS rules and measurement assistance information that includes the IP address and the UDP port numbers used by the PMF protocol in the UPF 307. In addition, the PDU Session Establishment Accept contains the first indicator, which indicates to UE to apply measurements per QoS flow for the MA PDU Session. The first indicator may be contained within the measurement assistance information (messaging 331).

At Step 8, the normal NGAP PDU Session Resource Setup procedure is executed between the AMF 303 and the 5G Access Network 301. The PDU Session Establishment Accept message is embedded within the NGAP PDU Session Resource Setup Request message (messaging 333).

At Step 9, a DL NAS Transport message is sent to the UE 205 which contains the PDU Session Establishment Accept message. Since the UE 205 receives the ATSSS Container (including ATSSS rules and measurement assistance information including first indicator=apply measurements per QoS flow), the UE 205 determines that the MA PDU Session establishment request was accepted by the network (messaging 335). The first indicator in the measurement assistance information may be either a single indicator indicating to a UE to apply measurements per QoS flow, or may be a list of QoS flows indicating to the UE to apply measurements per QoS flow in each one of the QoS flows included in the list.

At Step 10, based on the first indicator received in Step 9 (e.g., within the measurement assistance information), the UE 205 is configured to apply measurements per QoS flow. Hence, whenever it needs to perform measurements to determine the access on which the UL data traffic of an SDF should be sent, the UE 205 shall send the applicable PMF messages on the target QoS flow (e.g., on the QoS flow on which the UL data traffic of the SDF is sent) (block 337).

Figure 4:
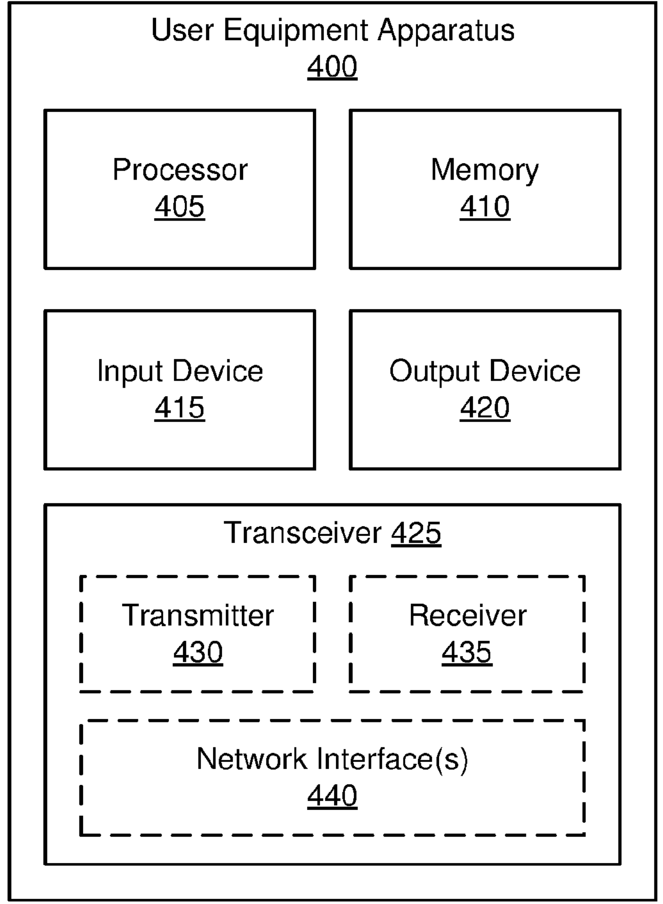
FIG. 4 is a block diagram illustrating one embodiment of a user equipment apparatus for quality of service flow selection for a multi-access data connection.

FIG. 4 depicts one embodiment of a user equipment apparatus 400 that may be used for quality of service flow selection for a multi-access data connection, according to embodiments of the disclosure. The user equipment apparatus 400 may be one embodiment of the remote unit 105 and/or the UE 205. Furthermore, the user equipment apparatus 400 may include a processor 405, a memory 410, an input device 415, an output device 420, a transceiver 425. In some embodiments, the input device 415 and the output device 420 are combined into a single device, such as a touch screen. In certain embodiments, the user equipment apparatus 400 does not include any input device 415 and/or output device 420.

As depicted, the transceiver 425 includes at least one transmitter 430 and at least one receiver 435. Here, the transceiver 425 communicates with a mobile core network (e.g., a 5GC) via one or more access networks. Additionally, the transceiver 425 may support at least one network interface 440. Here, the at least one network interface 440 facilitates communication with an eNB or gNB (e.g., using the "Uu" interface). Additionally, the at least one network interface 440 may include an interface used for communications with an AMF, an SMF, and/or a UPF.

In some embodiments, the transceiver 425 comprises a first transceiver that communicates with a mobile communication network via a first access network and a second transceiver that communicates with the mobile communication network via a second access network. In other embodiments, the transceiver 425 comprises a first functionality (e.g., modem) for communicating with the mobile communication network via the first access network and a second functionality (e.g., modem) for communicating with the mobile communication network via the second access network.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 sends a request message containing a first capability indicating that the apparatus supports measurements per quality of service flow.

The processor 405 receives a response message containing a first indicator, the first indicator provided in response to containing the first capability in the request message, wherein the response message establishes a multi-access data connection supporting communication over the first access network and the second access network, and wherein the multi-access data connection supports a plurality of quality of service flows including a default quality of service flow. The first indicator may be in measurement assistance information and may be either a single indicator indicating to a UE to apply measurements per QoS flow, or may be a list of QoS flows indicating to the UE to apply measurements per QoS flow in each one of the QoS flows included in the list.

The processor 405 sends a performance measurement function message to measure a first performance parameter for a first service data flow, wherein the first service data flow is transmitted on a target quality of service flow from the plurality of quality of service flows of the multi-access data connection, and wherein: the performance measurement function message is transmitted on the target quality of service flow of the multi-access data connection in response to the first indicator containing a first value; and the performance measurement function message is transmitted on the default quality of service flow of the multi-access data connection in response to the first indicator containing a second value.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to quality of service flow selection for a multi-access data connection, for example storing access network information ("ANI"), IP addresses, and the like. In certain embodiments, the memory 410 also stores program code and related data, such as an operating system ("OS") or other controller algorithms operating on the user equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, a liquid crystal display ("LCD") display, an LED display, an organic light emitting diode ("OLED") display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. Although only one transmitter 430 and one receiver 435 are illustrated, the user equipment apparatus 400 may have any suitable number of transmitters 430 and receivers 435. Further, the transmitter (s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an application-specific integrated circuit ("ASIC"), or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
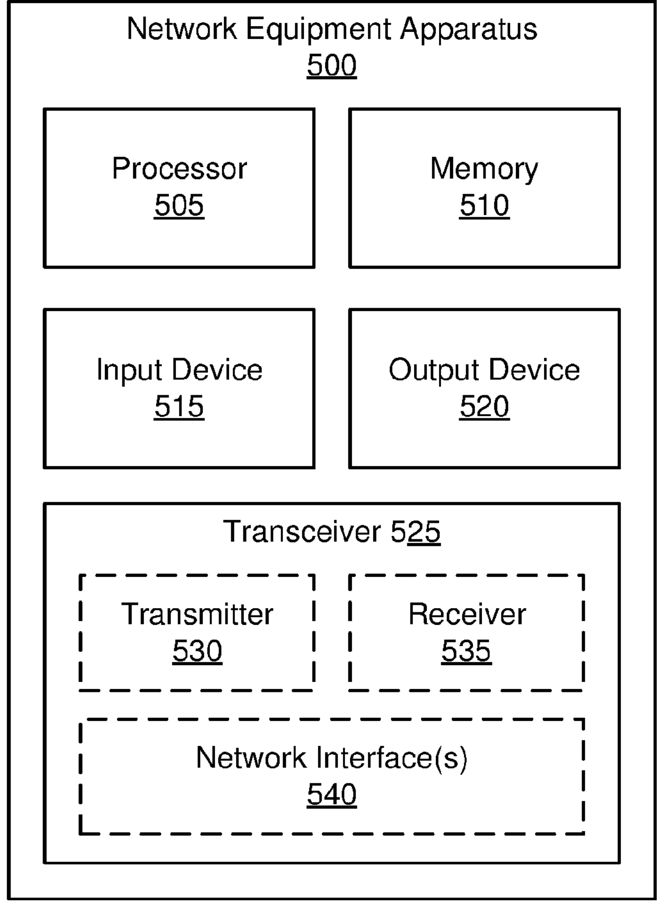
FIG. 5 is a block diagram illustrating one embodiment of a network equipment apparatus for quality of service flow selection for a multi-access data connection.

FIG. 5 depicts one embodiment of a network equipment apparatus 500 that may be used for quality of service flow selection for a multi-access data connection, according to embodiments of the disclosure. In some embodiments, the network equipment apparatus 500 may implement an SMF. In other embodiments, the network equipment apparatus 500 may implement other network functions. Furthermore, network equipment apparatus 500 may include a processor 505, a memory 510, an input device 515, an output device 520, a transceiver 525. In some embodiments, the input device 515 and the output device 520 are combined into a single device, such as a touch screen. In certain embodiments, the network equipment apparatus 500 does not include any input device 515 and/or output device 520.

As depicted, the transceiver 525 includes at least one transmitter 530 and at least one receiver 535. Here, the transceiver 525 communicates with one or more remote units 105. Additionally, the transceiver 525 may support at least one network interface 540. In some embodiments, the transceiver 525 supports a first interface for communicating with a RAN node, a second interface for communicating with one or more network functions in a mobile core network (e.g., a 5GC) and a third interface for communicating with a remote unit (e.g., UE).

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the network equipment apparatus 500 operates as an SMF. In such embodiments, the processor 505 determines based on the first capability whether the user equipment supports measurements per quality of service flow.

The processor 505, in response to determining that the user equipment supports measurements per quality of service flow: selects a user plane function; sends a session establishment request message containing a second indicator to the user plane function, wherein the second indicator indicates whether the user plane function must perform access measurements per quality of service flow over the multi-access data connection; and sends a response message containing a first indicator to the user equipment, wherein the response message establishes the multi-access data connection and wherein the first indicator indicates that the user equipment must perform access measurements per quality of service flow over the multi-access data connection. The first indicator may be in measurement assistance information and may be either a single indicator indicating to a UE to apply measurements per QoS flow, or may be a list of QoS flows indicating to the UE to apply measurements per QoS flow in each one of the QoS flows included in the list.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to quality of service flow selection for a multi-access data connection, for example storing ANI, IP addresses, UE contexts, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
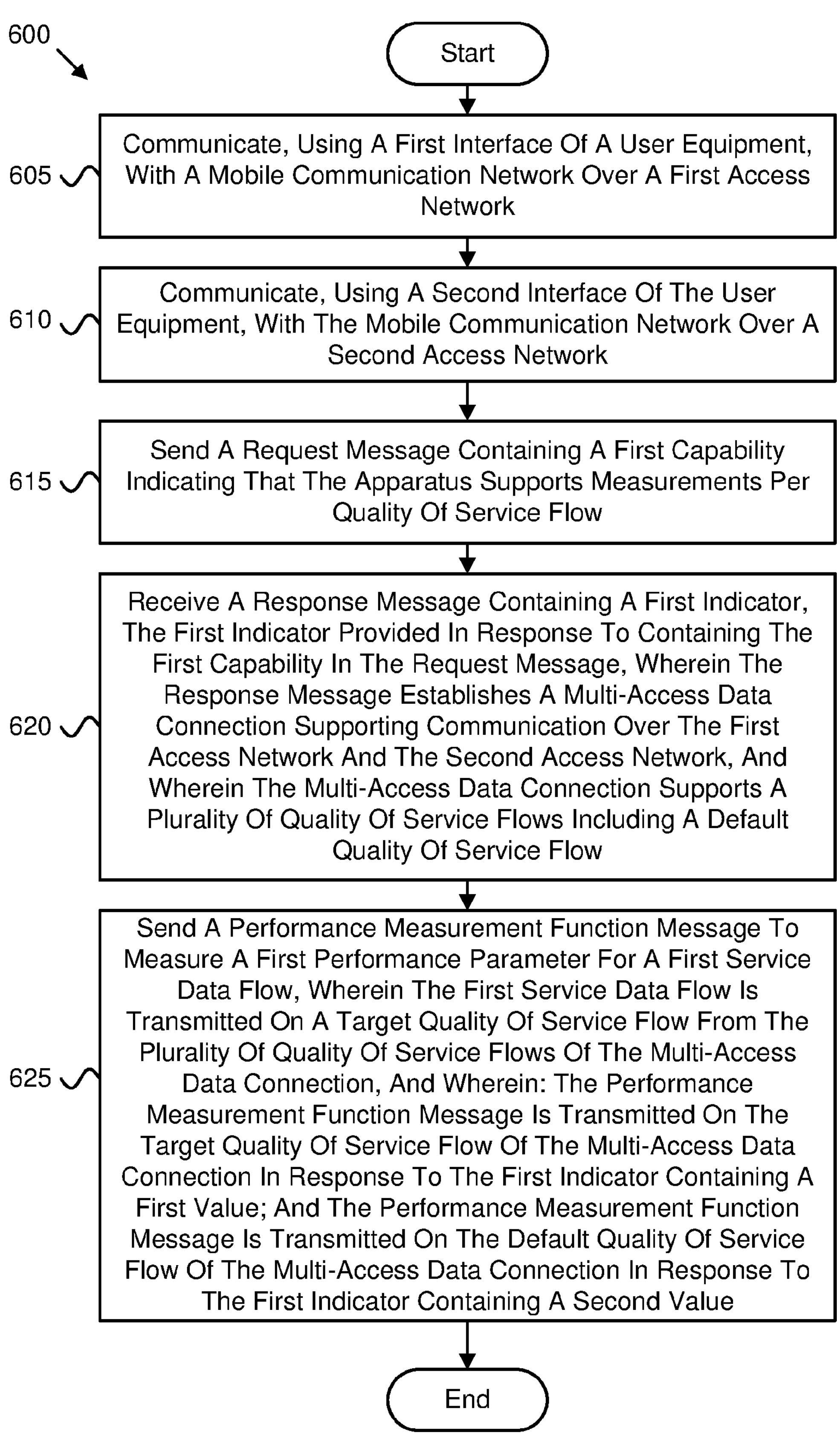
FIG. 6 is a flow chart diagram illustrating one embodiment of a first method for quality of service flow selection for a multi-access data connection.

FIG. 6 depicts a method 600 for quality of service flow selection for a multi-access data connection, according to embodiments of the disclosure. In some embodiments, the method 600 is performed by a UE, such as the remote unit 105, the UE 205 and/or the user equipment apparatus 400. In certain embodiments, the method 600 may be performed by a processor executing program code, for example, a microcontroller, a microprocessor, a CPU, a GPU, an auxiliary processing unit, a FPGA, or the like.

The method 600 begins and communicates 605, using a first interface of a user equipment, with a mobile communication network over a first access network. The method 600 includes communicating 610, using a second interface of the user equipment, with the mobile communication network over a second access network. The method 600 includes sending 615 a request message containing a first capability indicating that the apparatus supports measurements per quality of service flow. The method 600 includes receiving 620 a response message containing a first indicator, the first indicator provided in response to containing the first capability in the request message, wherein the response message establishes a multi-access data connection supporting communication over the first access network and the second access network, and wherein the multi-access data connection supports a plurality of quality of service flows including a default quality of service flow. The method 600 includes sending 625 a performance measurement function message to measure a first performance parameter for a first service data flow, wherein the first service data flow is transmitted on a target quality of service flow from the plurality of quality of service flows of the multi-access data connection, and wherein: the performance measurement function message is transmitted on the target quality of service flow of the multi-access data connection in response to the first indicator containing a first value; and the performance measurement function message is transmitted on the default quality of service flow of the multi-access data connection in response to the first indicator containing a second value. The method 600 ends.

In certain embodiments, the performance measurement function message is transmitted on the default quality of service flow of the multi-access data connection if the first indicator is not present in the response message. In some embodiments, the request message is a protocol data unit session establishment request message containing a multi-access protocol data unit indication and the first capability in a fifth generation session management capability element. In various embodiments, the response message is a protocol data unit session establishment accept message containing measurement assistance information and the first indicator is part of the measurement assistance information.

In one embodiment, the performance measurement function message is sent on the target quality of service flow over the first access network and on the target quality of service flow over the second access network in response to the first indicator containing the first value. In certain embodiments, the method 600 further comprises determining the first performance parameter by transmitting several performance measurement function messages on the target quality of service flow over the first access network and several performance measurement function messages on the target quality of service flow over the second access network.

In some embodiments, the performance measurement function message is sent on the default quality of service flow over the first access network and on the default quality of service flow over the second access network in response to the first indicator containing the second value. In various embodiments, the method 600 further comprises determining the first performance parameter by transmitting several performance measurement function messages on the default quality of service flow over the first access network and several performance measurement function messages on the default quality of service flow over the second access network.

In one embodiment, the first value indicates that the user equipment must perform access measurements per quality of service flow, and the second value indicates that the user equipment must not perform access measurements per quality of service flow. In certain embodiments, the first performance parameter comprises a round-trip time or a packet loss rate. In some embodiments, the method 600 further comprises applying the first performance parameter to determine whether the traffic of the first service data flow is to be sent on the first access network of the multi-access data connection or on the second access network of the multi-access data connection.

Figure 7:
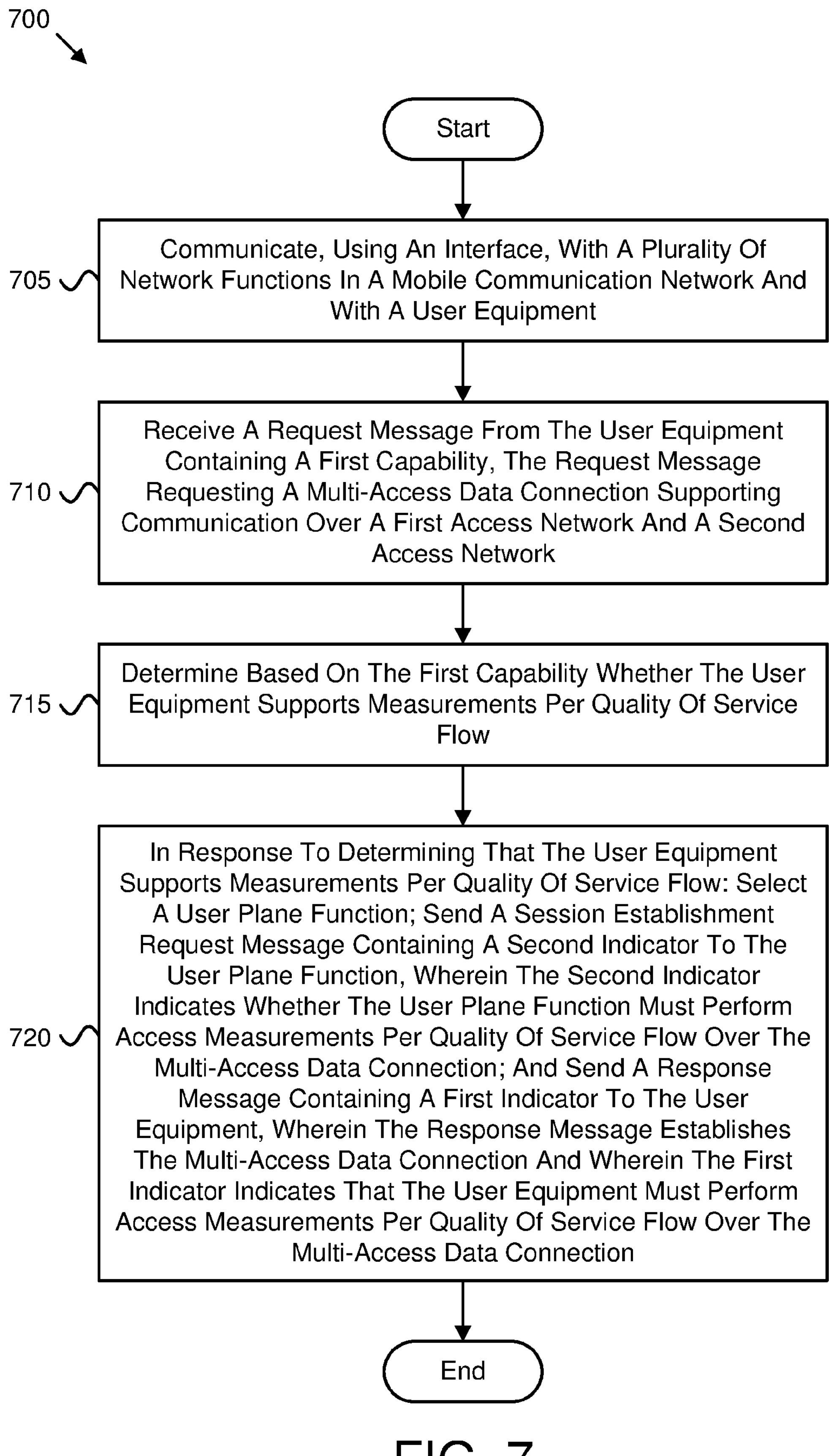
FIG. 7 is a flow chart diagram illustrating one embodiment of a second method for quality of service flow selection for a multi-access data connection.

FIG. 7 depicts a method 700 for quality of service flow selection for a multi-access data connection, according to embodiments of the disclosure. In some embodiments, the method 700 is performed by a session management function, such as the SMF 305 and/or the network apparatus 500. In certain embodiments, the method 700 may be performed by a processor executing program code, for example, a microcontroller, a microprocessor, a CPU, a GPU, an auxiliary processing unit, a FPGA, or the like.

The method 700 begins and communicates 705, using an interface, with a plurality of network functions in a mobile communication network and with a user equipment. The method 700 includes receiving 710 a request message from the user equipment containing a first capability, the request message requesting a multi-access data connection supporting communication over a first access network and a second access network. The method 700 includes determining 715 based on the first capability whether the user equipment supports measurements per quality of service flow. The method 700 includes, in response to determining that the user equipment supports measurements per quality of service flow: selecting 720 a user plane function; sending a session establishment request message containing a second indicator to the user plane function, wherein the second indicator indicates whether the user plane function must perform access measurements per quality of service flow over the multi-access data connection; and sending a response message containing a first indicator to the user equipment, wherein the response message establishes the multi-access data connection and wherein the first indicator indicates that the user equipment must perform access measurements per quality of service flow over the multi-access data connection. The method 700 ends.

In certain embodiments, the mobile communication network supports a plurality of user plane functions, and wherein selecting the user plane function comprises selecting a user plane function from the plurality of user plane functions that supports measurements per quality of service flow. In some embodiments: in response to the second indicator indicating that the user plane function must perform access measurements per quality of service flow, the user plane function transmits a performance measurement function message on a target quality of service flow of the multi-access data connection; in response to the second indicator indicating that the user plane function must not perform access measurements per quality of service flow, the user plane function transmits a performance measurement function message on a default quality of service flow of the multi-access data connection; or a combination thereof.

In various embodiments, in response to the second indicator being absent in the session establishment request message, the user plane function transmits a performance measurement function message on a default quality of service flow of the multi-access data connection. In one embodiment, the request message is a protocol data unit session establishment request message containing a multi-access protocol data unit indication and the first capability in a fifth generation session management capability element.

In certain embodiments, the response message is a protocol data unit session establishment accept message containing measurement assistance information and the first indicator is part of the measurement assistance information. In some embodiments: in response to the first indicator indicating that the user equipment must perform access measurements per quality of service flow, the user equipment transmits a performance measurement function message on a target quality of service flow of the multi-access data connection; in response to the first indicator indicating that the user equipment must not perform access measurements per quality of service flow, the user equipment transmits a performance measurement function message on a default quality of service flow of the multi-access data connection; or a combination thereof. In various embodiments, in response to the first indicator being absent in the session establishment request message, the user equipment transmits a performance measurement function message on a default quality of service flow of the multi-access data connection.

In one embodiment, an apparatus comprises: a first interface that communicates with a mobile communication network over a first access network; a second interface that communicates with the mobile communication network over a second access network; and a processor that: sends a request message containing a first capability indicating that the apparatus supports measurements per quality of service flow; receives a response message containing a first indicator, the first indicator provided in response to containing the first capability in the request message, wherein the response message establishes a multi-access data connection supporting communication over the first access network and the second access network, and wherein the multi-access data connection supports a plurality of quality of service flows including a default quality of service flow; and sends a performance measurement function message to measure a first performance parameter for a first service data flow, wherein the first service data flow is transmitted on a target quality of service flow from the plurality of quality of service flows of the multi-access data connection, and wherein: the performance measurement function message is transmitted on the target quality of service flow of the multi-access data connection in response to the first indicator containing a first value; and the performance measurement function message is transmitted on the default quality of service flow of the multi-access data connection in response to the first indicator containing a second value.

In certain embodiments, the performance measurement function message is transmitted on the default quality of service flow of the multi-access data connection if the first indicator is not present in the response message.

In some embodiments, the request message is a protocol data unit session establishment request message containing a multi-access protocol data unit indication and the first capability in a fifth generation session management capability element.

In various embodiments, the response message is a protocol data unit session establishment accept message containing measurement assistance information and the first indicator is part of the measurement assistance information.

In one embodiment, the performance measurement function message is sent on the target quality of service flow over the first access network and on the target quality of service flow over the second access network in response to the first indicator containing the first value.

In certain embodiments, the processor determines the first performance parameter by transmitting several performance measurement function messages on the target quality of service flow over the first access network and several performance measurement function messages on the target quality of service flow over the second access network.

In some embodiments, the performance measurement function message is sent on the default quality of service flow over the first access network and on the default quality of service flow over the second access network in response to the first indicator containing the second value.

In various embodiments, the processor determines the first performance parameter by transmitting several performance measurement function messages on the default quality of service flow over the first access network and several performance measurement function messages on the default quality of service flow over the second access network.

In one embodiment, the first value indicates that the apparatus must perform access measurements per quality of service flow, and the second value indicates that the apparatus must not perform access measurements per quality of service flow.

In certain embodiments, the first performance parameter comprises a round-trip time or a packet loss rate.

In some embodiments, the processor further applies the first performance parameter to determine whether the traffic of the first service data flow is to be sent on the first access network of the multi-access data connection or on the second access network of the multi-access data connection.

In one embodiment, a method comprises: communicating, using a first interface of a user equipment, with a mobile communication network over a first access network; communicating, using a second interface of the user equipment, with the mobile communication network over a second access network; sending a request message containing a first capability indicating that the apparatus supports measurements per quality of service flow; receiving a response message containing a first indicator, the first indicator provided in response to containing the first capability in the request message, wherein the response message establishes a multi-access data connection supporting communication over the first access network and the second access network, and wherein the multi-access data connection supports a plurality of quality of service flows including a default quality of service flow; and sending a performance measurement function message to measure a first performance parameter for a first service data flow, wherein the first service data flow is transmitted on a target quality of service flow from the plurality of quality of service flows of the multi-access data connection, and wherein: the performance measurement function message is transmitted on the target quality of service flow of the multi-access data connection in response to the first indicator containing a first value; and the performance measurement function message is transmitted on the default quality of service flow of the multi-access data connection in response to the first indicator containing a second value.

In certain embodiments, the performance measurement function message is transmitted on the default quality of service flow of the multi-access data connection if the first indicator is not present in the response message.

In some embodiments, the request message is a protocol data unit session establishment request message containing a multi-access protocol data unit indication and the first capability in a fifth generation session management capability element.

In various embodiments, the response message is a protocol data unit session establishment accept message containing measurement assistance information and the first indicator is part of the measurement assistance information.

In one embodiment, the performance measurement function message is sent on the target quality of service flow over the first access network and on the target quality of service flow over the second access network in response to the first indicator containing the first value.

In certain embodiments, the method further comprises determining the first performance parameter by transmitting several performance measurement function messages on the target quality of service flow over the first access network and several performance measurement function messages on the target quality of service flow over the second access network.

In some embodiments, the performance measurement function message is sent on the default quality of service flow over the first access network and on the default quality of service flow over the second access network in response to the first indicator containing the second value.

In various embodiments, the method further comprises determining the first performance parameter by transmitting several performance measurement function messages on the default quality of service flow over the first access network and several performance measurement function messages on the default quality of service flow over the second access network.

In one embodiment, the first value indicates that the user equipment must perform access measurements per quality of service flow, and the second value indicates that the user equipment must not perform access measurements per quality of service flow.

In certain embodiments, the first performance parameter comprises a round-trip time or a packet loss rate.

In some embodiments, the method further comprises applying the first performance parameter to determine whether the traffic of the first service data flow is to be sent on the first access network of the multi-access data connection or on the second access network of the multi-access data connection.

In one embodiment, an apparatus comprises: an interface that communicates with a plurality of network functions in a mobile communication network and with a user equipment; and a processor that: receives a request message from the user equipment containing a first capability, the request message requesting a multi-access data connection supporting communication over a first access network and a second access network; determines based on the first capability whether the user equipment supports measurements per quality of service flow; and, in response to determining that the user equipment supports measurements per quality of service flow: selects a user plane function; sends a session establishment request message containing a second indicator to the user plane function, wherein the second indicator indicates whether the user plane function must perform access measurements per quality of service flow over the multi-access data connection; and sends a response message containing a first indicator to the user equipment, wherein the response message establishes the multi-access data connection and wherein the first indicator indicates that the user equipment must perform access measurements per quality of service flow over the multi-access data connection.

In certain embodiments, the mobile communication network supports a plurality of user plane functions, and wherein selecting the user plane function comprises selecting a user plane function from the plurality of user plane functions that supports measurements per quality of service flow.

In some embodiments: in response to the second indicator indicating that the user plane function must perform access measurements per quality of service flow, the user plane function transmits a performance measurement function message on a target quality of service flow of the multi-access data connection; in response to the second indicator indicating that the user plane function must not perform access measurements per quality of service flow, the user plane function transmits a performance measurement function message on a default quality of service flow of the multi-access data connection; or a combination thereof.

In various embodiments, in response to the second indicator being absent in the session establishment request message, the user plane function transmits a performance measurement function message on a default quality of service flow of the multi-access data connection.

In one embodiment, the request message is a protocol data unit session establishment request message containing a multi-access protocol data unit indication and the first capability in a fifth generation session management capability element.

In certain embodiments, the response message is a protocol data unit session establishment accept message containing measurement assistance information and the first indicator is part of the measurement assistance information.

In some embodiments: in response to the first indicator indicating that the user equipment must perform access measurements per quality of service flow, the user equipment transmits a performance measurement function message on a target quality of service flow of the multi-access data connection; in response to the first indicator indicating that the user equipment must not perform access measurements per quality of service flow, the user equipment transmits a performance measurement function message on a default quality of service flow of the multi-access data connection; or a combination thereof.

In various embodiments, in response to the first indicator being absent in the session establishment request message, the user equipment transmits a performance measurement function message on a default quality of service flow of the multi-access data connection.

In one embodiment, a method comprises: communicating, using an interface, with a plurality of network functions in a mobile communication network and with a user equipment; receiving a request message from the user equipment containing a first capability, the request message requesting a multi-access data connection supporting communication over a first access network and a second access network; determining based on the first capability whether the user equipment supports measurements per quality of service flow; and, in response to determining that the user equipment supports measurements per quality of service flow: selecting a user plane function; sending a session establishment request message containing a second indicator to the user plane function, wherein the second indicator indicates whether the user plane function must perform access measurements per quality of service flow over the multi-access data connection; and sending a response message containing a first indicator to the user equipment, wherein the response message establishes the multi-access data connection and wherein the first indicator indicates that the user equipment must perform access measurements per quality of service flow over the multi-access data connection.

In certain embodiments, the mobile communication network supports a plurality of user plane functions, and wherein selecting the user plane function comprises selecting a user plane function from the plurality of user plane functions that supports measurements per quality of service flow.

In some embodiments: in response to the second indicator indicating that the user plane function must perform access measurements per quality of service flow, the user plane function transmits a performance measurement function message on a target quality of service flow of the multi-access data connection; in response to the second indicator indicating that the user plane function must not perform access measurements per quality of service flow, the user plane function transmits a performance measurement function message on a default quality of service flow of the multi-access data connection; or a combination thereof.

In various embodiments, in response to the second indicator being absent in the session establishment request message, the user plane function transmits a performance measurement function message on a default quality of service flow of the multi-access data connection.

In one embodiment, the request message is a protocol data unit session establishment request message containing a multi-access protocol data unit indication and the first capability in a fifth generation session management capability element.

In certain embodiments, the response message is a protocol data unit session establishment accept message containing measurement assistance information and the first indicator is part of the measurement assistance information.

In some embodiments: in response to the first indicator indicating that the user equipment must perform access measurements per quality of service flow, the user equipment transmits a performance measurement function message on a target quality of service flow of the multi-access data connection; in response to the first indicator indicating that the user equipment must not perform access measurements per quality of service flow, the user equipment transmits a performance measurement function message on a default quality of service flow of the multi-access data connection; or a combination thereof.

In various embodiments, in response to the first indicator being absent in the session establishment request message, the user equipment transmits a performance measurement function message on a default quality of service flow of the multi-access data connection.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
send a request message containing a first capability indicating that the UE supports measurements per quality of service (QoS) flow;
receive a response message containing a first indicator, wherein the first indicator is received in response to the request message, wherein the response message establishes a multi-access data connection for communication over a first access network and a second access network, and wherein the multi-access data connection supports a plurality of QoS flows including a default QoS flow; and
send a performance measurement function message to measure a first performance parameter for a first service data flow, wherein the first service data flow is associated with a QoS flow from the plurality of QoS flows, wherein the measurement of the first performance parameter is on each QoS flow of the plurality of QoS flows in response to the first indicator containing a first value, and wherein the measurement of the first performance parameter is on the default QoS flow in response to the first indicator containing a second value.

2. The UE of claim 1, wherein the performance measurement function message is transmitted on the default QoS flow of the multi-access data connection if the first indicator is not present in the response message.

3. The UE of claim 1, wherein the request message is a protocol data unit session establishment request message containing a multi-access protocol data unit indication and the first capability in a fifth generation session management capability element.

4. The UE of claim 1, wherein the response message is a protocol data unit session establishment accept message containing measurement assistance information and the first indicator is part of the measurement assistance information.

5. The UE of claim 1, wherein the performance measurement function message is sent on the QoS flow over the first access network and on the QoS flow over the second access network in response to the first indicator containing the first value.

6. The UE of claim 5, wherein the at least one processor is configured to cause the UE to determine the first performance parameter by transmitting several performance measurement function messages on the QoS flow over the first access network and several performance measurement function messages on the QoS flow over the second access network.

7. The UE of claim 1, wherein the performance measurement function message is sent on the default QoS flow over the first access network and on the default QoS flow over the second access network in response to the first indicator containing the second value.

8. The UE of claim 7, wherein the at least one processor is configured to cause the UE to determine the first performance parameter by transmitting several performance measurement function messages on the default QoS flow over the first access network and several performance measurement function messages on the default QoS flow over the second access network.

9. The UE of claim 1, wherein the first value indicates that the UE performs access measurements per QoS flow, and the second value indicates that the UE performs access measurements solely on the default QoS flow.

10. The UE of claim 1, wherein the at least one processor is configured to cause the UE to further apply the first performance parameter to determine whether traffic of the first service data flow is to be sent on the first access network of the multi-access data connection or on the second access network of the multi-access data connection.

11. A method performed by a user equipment (UE), the method comprising:

sending a request message containing a first capability indicating that the UE supports measurements per quality of service (QoS) flow;

receiving a response message containing a first indicator, wherein the first indicator is received in response to the request message, wherein the response message establishes a multi-access data connection for communication over a first access network and a second access network, and wherein the multi-access data connection supports a plurality of QoS flows including a default QoS flow; and sending a performance measurement function message to measure a first performance parameter for a first service data flow, wherein the first service data flow is associated with a QoS flow from the plurality of QoS flows, wherein the measurement of the first performance parameter is on each QoS flow of the plurality of QoS flows in response to the first indicator containing a first value, and wherein the measurement of the first performance parameter is on the default QoS flow in response to the first indicator containing a second value.

12. The method of claim 11, wherein the performance measurement function message is transmitted on the default QoS flow of the multi-access data connection if the first indicator is not present in the response message.

13. The method of claim 11, wherein the request message is a protocol data unit session establishment request message containing a multi-access protocol data unit indication and the first capability in a fifth generation session management capability element.

14. The method of claim 11, wherein the response message is a protocol data unit session establishment accept message containing measurement assistance information and the first indicator is part of the measurement assistance information.

15. The method of claim 11, wherein the performance measurement function message is sent on the QoS flow over the first access network and on the QoS flow over the second access network in response to the first indicator containing the first value.

16. The method of claim 15, further comprising determining the first performance parameter by transmitting several performance measurement function messages on the QoS flow over the first access network and several performance measurement function messages on the QoS flow over the second access network.

17. The method of claim 11, wherein the performance measurement function message is sent on the default QoS flow over the first access network and on the default QoS flow over the second access network in response to the first indicator containing the second value.

18. The method of claim 17, further comprising determining the first performance parameter by transmitting several performance measurement function messages on the default QoS flow over the first access network and several performance measurement function messages on the default QoS flow over the second access network.

19. The method of claim 11, wherein the first value indicates that the UE performs access measurements per QoS flow, and the second value indicates that the UE performs access measurements solely on the default QoS flow.

20. A processor for wireless communication, comprising:

at least one controller coupled with at least one memory and configured to cause the processor to:

send a request message containing a first capability indicating that the processor supports measurements per quality of service QoS flow;

receive a response message containing a first indicator, wherein the first indicator is received in response to the request message, wherein the response message establishes a multi-access data connection for communication over a first access network and a second access network, and wherein the multi-access data connection supports a plurality of QoS flows including a default QoS flow; and send a performance measurement function message to measure a first performance parameter for a first service data flow, wherein the first service data flow is associated with a QoS flow from the plurality of QoS flows, wherein the measurement of the first performance parameter is on each QoS flow of the plurality of QoS flows in response to the first indicator containing a first value, and wherein the measurement of the first performance parameter is on the default QoS flow in response to the first indicator containing a second value.

* * * * *